March 15, 1949.  H. H. ROBY  2,464,463
HUB ASSEMBLY FOR AIRCRAFT PROPELLERS

Filed May 11, 1945  2 Sheets-Sheet 1

INVENTOR.
Horace H. Roby
BY
Thos. E. Scofield
ATTORNEY

March 15, 1949. H. H. ROBY 2,464,463
HUB ASSEMBLY FOR AIRCRAFT PROPELLERS
Filed May 11, 1945 2 Sheets-Sheet 2

INVENTOR.
Horace H. Roby
BY
ATTORNEY

Patented Mar. 15, 1949

2,464,463

UNITED STATES PATENT OFFICE 2,464,463

HUB ASSEMBLY FOR AIRCRAFT PROPELLERS

Horace H. Roby, Wichita, Kans., assignor, by mesne assignments, to Beech Aircraft Corporation, a corporation of Delaware Application May 11, 1945, Serial No. 593,226

8 Claims. (Cl. 170—173)

This invention relates to improvements in hub assemblies for aircraft propellers and refers more particularly to hub assemblies for controllable pitch propellers that provide a rigid connection between the engine shaft and the hub barrel.

The instant hub construction is an improvement over the hub assembly disclosed in Patent 2,347,282, dated April 25, 1944.

This hub construction is especially adapted to transmit heavy torque stresses from the drive shaft to the propeller blades through a rigid spider splined to the shaft and fixedly attached to the hub barrel.

Among the objects of the invention is to provide a construction in which a rigid spider surrounds the propeller shaft and spans the space between the shaft and hub so torque stresses of the shaft are transmitted uniformly over the walls of the hub and to the propeller mountings.

Another object is to provide a hub assembly which is easily machined, easily assembled and disassembled and applied or removed from the engine shaft with facility.

Other and further objects of the invention will appear from the following description.

Figure 1:
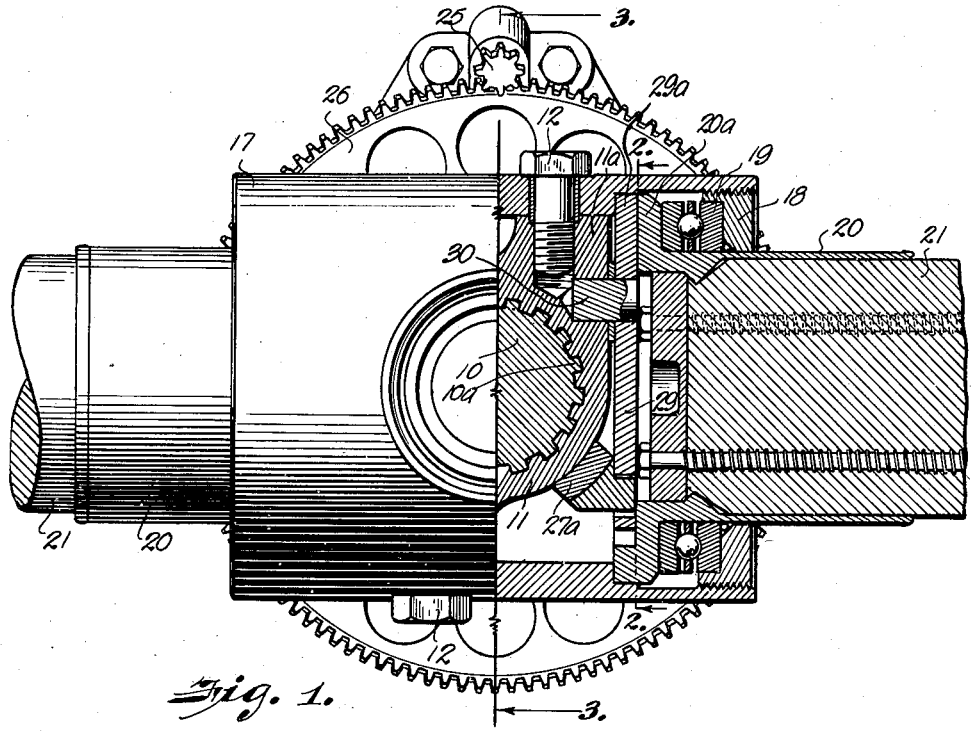
Figure 2:
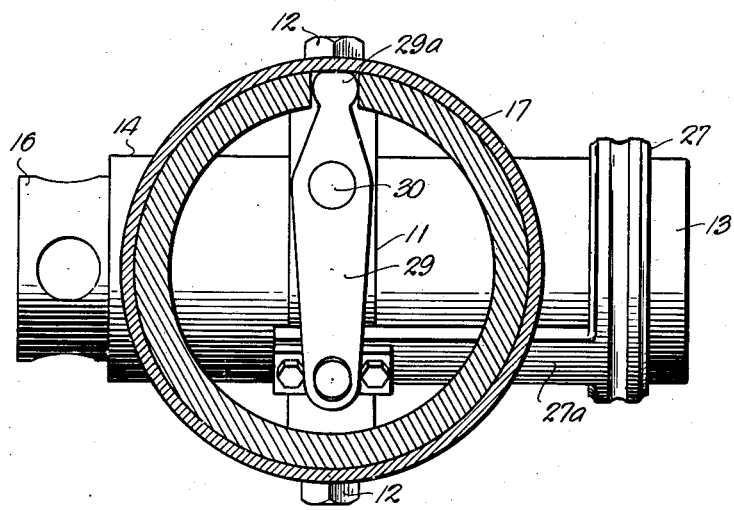
Figures 3, 4:
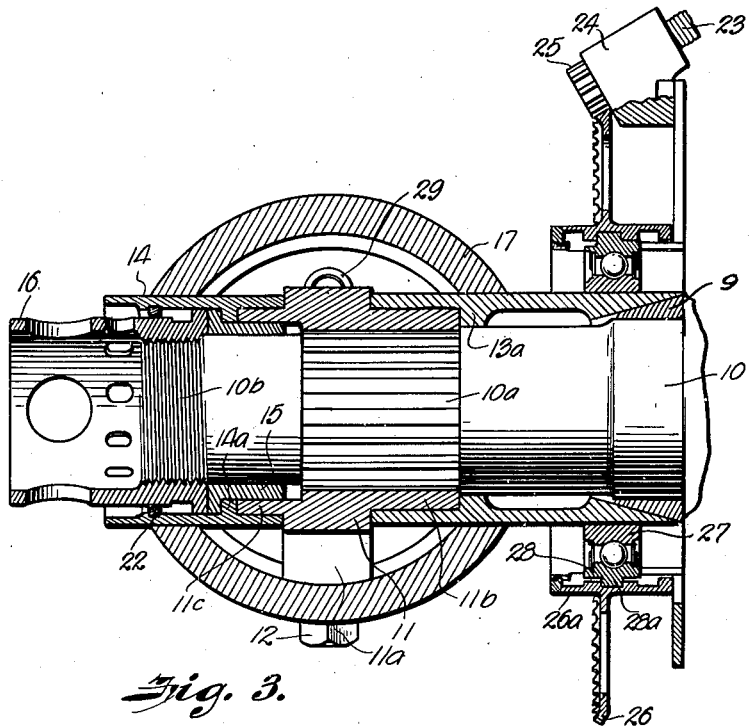

In the accompanying drawings which form a part of the instant specification and are to be read in conjunction therewith and in which like reference numerals are used to indicate like parts in the various views, Fig. 1 is a front view of the hub assembly showing one-half in section, Fig. 2 is a view taken along the line 2—2 in Fig. 1 in the direction of the arrows, Fig. 3 is a view taken along the line 3—3 in Fig. 1 in the direction of the arrows, Fig. 4 is an exploded view of the two part sleeve and spider which surround the engine shaft and to which the hub barrel is fastened.

To facilitate an understanding of the invention the description will be separated and explained under two headings; first will be described the sleeve and spider arrangement which transmits the shaft torque to the hub barrel and propeller blades, and second, the pitch control mechanism indicating its relationship to the hub assembly, although the mechanism as such forms the subject matter of a patent, 2,281,456, dated April 28, 1942.

Hub assembly

At 10 is shown a portion of the front end of an engine shaft of an airplane motor. The shaft is splined at 10a and is threaded at its end as shown at 10b. Fitted to the splined portion is a spider 11 which has outwardly extending bosses 11a. These bosses are drilled and the holes threaded to receive bolts or dowels 12. Surrounding the shaft 10 and fitting against a split cone 9 at the rear and over a cylindrical portion 11b of the spider at the front is a rear sleeve portion 13. Surrounding the shaft and fitting over the cylindrical portion 11c of the spider is a front sleeve portion 14. A ring 13a is machined within the rear sleeve 13, the forward shoulder of the ring abutting the rear end of the spider and the front end of the sleeve collar 11d of the spider when the hub is assembled. Within the front sleeve is machined a ring or shoulder portion 14a which abuts the front end of the spider when the parts are assembled. At the same time the rear end of the sleeve abuts against the front of collar 11d of the spider. A bushing 15 fits within the cylindrical portion 11c of the spider and a front shoulder portion of the bushing engages internal ring 14a of the sleeve. A retaining nut 16 internally threaded is screwed onto the end of the shaft and abuts the front edge of the bushing. Thus when the rear sleeve, spider, front sleeve and bushing are placed upon the shaft they are drawn together into a unitary structure by nut 16. The nut is locked against removal by pins inserted in registering holes radially drilled through the nut and front sleeve not shown or other suitable locking means.

A hub barrel 17 whose axis is normal with the shaft has its wall drilled on opposite sides to receive bolts or dowels 12 which screw into the ends of bosses 11a of the spider. In the wall of the barrel and surrounding the bolt holes are hardened steel bushings or dowel sleeves which receive and take the torque stress of the engine shaft as it is transmitted from the shaft to the barrel and propeller blades. The hub barrel is also apertured to receive the rear and front sleeves 13 and 14. The ends of the hub are internally threaded and upon these threads are screwed rings 18 which hold thrust bearings 19 against flanges 20a of the propeller clamping member 20 thereby rotatably mounting the roots of the blades in the barrel. The inner ends of the propeller blades are shown diagrammatically at 21. In the forward end of the hub assembly between the front sleeve 14 and retainer nut 16 is a snap ring 22 fitted in a groove in the front sleeve. This snap ring acts as a puller for the front sleeve 14 and bushing 15 when the retainer nut 16 is removed.

Pitch control mechanism

The pitch of the propeller blades is adjusted from the pilot's seat usually from mechanism mounted on the instrument board through a flexible shaft or rigid shaft with universal joints, the front end of which is shown at 23. The shaft is supported by bearing 24 and on the shaft is a pinion 25 which meshes with the drive gear 26. Rotation of the drive gear by the pinion moves the control arm actuating ring 27 longitudinally of the shaft due to engagement of the square threads 28a on the outer periphery of the bearing race 28 with square threads cut on the internal surface of the base portion 26a of the drive gear. Since the longitudinal control arms 27a shown in Figs. 1 and 2 are a part of the actuating ring and are also connected to arms 29 pivoted at 30 on the sides of the spider bosses reciprocation of the longitudinal arms will move arms 29 about their pivots. Blade control arms 29 have their longer ends connected to longitudinal arms 27, while their shorter arms on opposite sides of the pivots have a rounded head 29a which fits into recesses formed in flanges 20a in the holding clamps of the propeller blades. Thus it will be seen that pivoting of the blade control arm rotates the blades upon their axis in either direction to the desired pitch which is governed from the pilot's seat through the mechanism described. The pitch control mechanism, while forming an essential part of the hub assembly to impose the desired pitch upon the propeller blades, is not an essential part of the instant invention. It is shown and described merely to depict an efficient operable control for adjusting pitch to any desired degree operable either manually or from a power drive not shown.

The novelty, as suggested earlier, resides in the manner in which engine torque is transmitted from the drive shaft to the propeller blades. The particular construction for accomplishing this result includes a two part sleeve inserted from opposite sides into the hub barrel. Mounted upon the shaft and having splined engagement therewith is a spider which is held against axial movement on the shaft by the sleeve parts. The spider is united to the hub barrel by sturdy bosses extending outwardly from the spider and affixed rigidly to the wall of the hub barrel by removable dowels or screw bolts. To obviate the possibility of the dowels or screw bolts becoming loosened due to excessive stresses imposed upon the shanks of the bolts or dowels hardened liners or bushings are inserted in the bolt holes closely fitting the shanks of the bolts and reducing possibility of wear or failure at these critical points.

The hub assembly is easily assembled and disassembled since the parts are held upon the shaft by a single retaining nut. Mounting of the pitch control mechanism about the rear sleeve within the hub barrel and pivoting of the control arms upon the bosses of the spider as well as mounting of the blades and attaching of the blade control arms to the bases of the blades is a procedure which is more or less obvious from the drawings. Since the pitch control mechanism forms the subject matter of the patent previously referred to, details of construction and assembly have been omitted here.

From the foregoing it will be seen that the invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having thus described my invention, I claim:

1. A propeller hub assembly adapted to be affixed to an engine shaft and providing mountings for the propeller blades comprising a spider fixedly attached to the shaft with elements extending outwardly therefrom, a hub barrel whose axis is normal with the axis of the shaft and whose inner wall is engaged by the outwardly extending elements of the spider, means fixedly connecting each of said outwardly extending elements to said barrel at the point of engagement between such element and the inner wall of said barrel, a two part sleeve surrounding the shaft, said sleeve fitting into apertures on opposite sides of the barrel and engaging the spider to hold same against axial movement on the shaft, and means attached to the end of the shaft for holding the parts in fixed relationship.

2. A propeller hub assembly as in claim 1 in which screw bolts are employed to fixedly attach the extending elements of the spider to the wall of the hub barrel.

3. A propeller hub assembly as in claim 1 in which screw bolts having hardened bushings surrounding the bolt shank fixedly attach the extending elements of the spider to the wall of the hub barrel and take the torque stress imposed upon the parts by the shaft's rotation.

4. A propeller hub assembly as in claim 1 in which the spider and shaft have splined engagement.

5. A propeller hub assembly as in claim 1 in which the two part sleeves abut shoulders on opposite sides of the spider to hold the spider against axial displacement on the shaft.

6. A propeller hub assembly adapted to be affixed to an engine shaft, comprising a blade supporting barrel having two oppositely disposed apertures for receiving the shaft, each aperture having therein an individual sleeve-like bushing encircling the shaft and supporting said barrel on said shaft, a sleeve encircling said shaft at a point between said bushings and within said barrel, means attached to the end of the shaft for holding said two bushings and said sleeve immovably in place on said shaft, and a plurality of projections on said sleeve each extending substantially tangentially of said shaft and engaging the inner wall of said blade-supporting barrel.

7. A propeller hub assembly adapted to be affixed to an engine shaft, comprising a blade-supporting barrel having two oppositely disposed apertures for receiving the shaft, each aperture having therein an individual sleeve-like bushing encircling the shaft and supporting said barrel on said shaft, a sleeve encircling said shaft at a point between said bushings and within said barrel, means attached to the end of the shaft for holding said two bushings and said sleeve immovably in place on said shaft, a plurality of projections on said sleeve each extending substantially tangentially of said shaft and engaging the inner wall of said blade-supporting barrel, and a threaded member extending through said barrel into a tapped hole in each of said projections to secure said barrel to said sleeve.

8. A propeller hub assembly adapted to be affixed to an engine shaft, comprising a blade-supporting barrel having two oppositely disposed apertures for receiving the shaft, each aperture having therein an individual sleeve-like bushing encircling the shaft and supporting said barrel on said shaft, a sleeve encircling said shaft at a point between said bushings and within said barrel, means attached to the end of the shaft for holding said two bushings and said sleeve immovably in place on said shaft, and torque transmitting members between and connecting said sleeve and said barrel having their axes substantially tangent to said shaft.

HORACE H. ROBY.

REFERENCES CITED

The following references are of record in the file of this patent:

UNITED STATES PATENTS

| Number | Name | Date |
|---|---|---|
| 1,942,126 | Roth | Jan. 2, 1934 |
| 2,347,282 | Roby | Apr. 25, 1944 |

FOREIGN PATENTS

| Number | Country | Date |
|---|---|---|
| 548,032 | Great Britain | Sept. 22, 1942 |